United States Patent
Okumura

(10) Patent No.: US 11,050,978 B2
(45) Date of Patent: Jun. 29, 2021

(54) MONITORING SYSTEM AND IMAGE PROCESSING APPARATUS

(71) Applicant: KYOCERA Document Solutions Inc., Osaka (JP)

(72) Inventor: Ryuichi Okumura, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/766,555

(22) PCT Filed: Oct. 4, 2018

(86) PCT No.: PCT/JP2018/037210
§ 371 (c)(1),
(2) Date: May 22, 2020

(87) PCT Pub. No.: WO2019/106956
PCT Pub. Date: Jun. 6, 2019

(65) Prior Publication Data
US 2020/0389627 A1    Dec. 10, 2020

(30) Foreign Application Priority Data
Nov. 29, 2017 (JP) .............................. JP2017-229670

(51) Int. Cl.
| H04N 7/18 | (2006.01) |
|---|---|
| G06T 7/70 | (2017.01) |
| G06T 7/593 | (2017.01) |
| H04N 13/239 | (2018.01) |
| G06T 5/00 | (2006.01) |

(52) U.S. Cl.
CPC ............. *H04N 7/183* (2013.01); *G06T 5/002* (2013.01); *G06T 7/593* (2017.01); *G06T 7/70* (2017.01); *H04N 13/239* (2018.05); *G06T 2207/30232* (2013.01)

(58) Field of Classification Search
CPC ...................... H04N 7/183; G06T 2207/30232
USPC ............................................................ 348/47
See application file for complete search history.

(56) References Cited

U.S. PATENT DOCUMENTS

| 2007/0115356 A1* | 5/2007 | Kang ............... G08B 13/19686 348/143 |
|---|---|---|
| 2009/0128632 A1* | 5/2009 | Goto ..................... G01S 3/7864 348/169 |
| 2009/0207269 A1* | 8/2009 | Yoda ...................... H04N 5/232 348/222.1 |
| 2018/0033151 A1* | 2/2018 | Matsumoto ........... G06T 7/0004 |

FOREIGN PATENT DOCUMENTS

JP    2009-194687    8/2009

* cited by examiner

*Primary Examiner* — Amir Shahnami

(57) ABSTRACT

A monitoring camera (1) photographs a predetermined location and outputs a photographed image; an image processing apparatus (2) acquires the photographed image from the monitoring camera (1) and performs a mask process of a specific part in the photographed image; and a monitoring apparatus (3) acquires and displays the photographed image after the mask process from the image processing apparatus (2). Further, the image processing apparatus (2) detects a frame image of a display device (101) in the acquired photographed image, and performs the mask process of an image of a display screen on the display device (101) on the basis of the detected frame image.

8 Claims, 4 Drawing Sheets

MONITORING SYSTEM AND IMAGE PROCESSING APPARATUS

TECHNICAL FIELD

The present invention relates to a monitoring system and an image processing apparatus.

BACKGROUND ART

An image processing apparatus detects a human face in a photographed image, and performs a mask process of the human face or its background image for privacy protection (see PATENT LITERATURE #1, for example).

Further, in a system, a mask area is set in a photographed image in accordance with a user operation, and a mask process is performed on the set mask area.

CITATION LIST

Patent Literature

PATENT LITERATURE #1: Japan Patent Application Publication No. 2009-194687.

SUMMARY OF INVENTION

Technical Problem

Such photographed images of a monitoring camera may be transferred to an external monitoring apparatus and monitored by an outsider (i.e. a security guard, a security company employee or the like).

When a display device of an electronic device such as personal computer exists in a sight of such monitoring camera, the photographed image of the monitoring camera includes an image on a display screen of the display device. Consequently, if confidential information is display on the display screen, the confidential information may be leaked because the confidential information is displayed on such an outsider's monitoring apparatus. Specifically, the confidential information is known by an outsider (i.e. a security guard, a security company employee, an intruder to an installation location of the monitoring apparatus or the like), and consequently, the confidential information may be leaked.

Although such a display screen of each electronic device is manually set as a mask area and a mask process is performed of the display screen by means of the aforementioned system, the manually setting is hardly performed practically when there are lots of such electronic devices. In addition, even if such mask areas are set, such mask area must be set again when a user changes installation places of such electronic devices (i.e. display devices), and consequently, managing the installation places of the electronic devices are always required, and it is not practically.

The present invention has been conceived in view of the aforementioned problem, and it is an object of the present invention to obtain a monitoring system and an image processing apparatus that can be used for such monitoring system, that restrain that confidential information is leaked from a display screen arranged in a sight of a monitoring camera.

Solution to Problem

A monitoring system according to the present invention includes: a monitoring camera that photographs a predetermined location and outputs a photographed image; an image processing apparatus that acquires the photographed image from the monitoring camera and performs a mask process of a specific part in the photographed image; and a monitoring apparatus that acquires and displays the photographed image after the mask process from the image processing apparatus. Further, the image processing apparatus (a) detects a frame image of a display device in the acquired photographed image, and (b) performs the mask process of an image of a display screen on the display device on the basis of the detected frame image.

An image processing apparatus according to the present invention includes: an image acquiring unit that acquires a photographed image from a monitoring camera that photographs a predetermined location and outputs the photographed image; a display area detecting unit that detects in the acquired photographed image a frame image of a display device installed in the predetermined location; a mask processing unit that performs a mask process of an image of a display screen on the display device in the acquired photographed image, on the basis of the detected frame image; and an image outputting unit that outputs to a monitoring apparatus the photographed image after the mask process.

Advantageous Effect of Invention

By means of the present invention, obtained are a monitoring system and an image processing apparatus that can be used for such monitoring system, that restrain that confidential information is leaked from a display screen arranged in a sight of a monitoring camera.

These and other objects, features and advantages of the present invention will become more apparent upon reading of the following detailed description along with the accompanied drawings.

DESCRIPTION OF EMBODIMENTS

Hereinafter, embodiments according to aspects of the present invention will be explained with reference to drawings.

Embodiment 1

Figure 1:
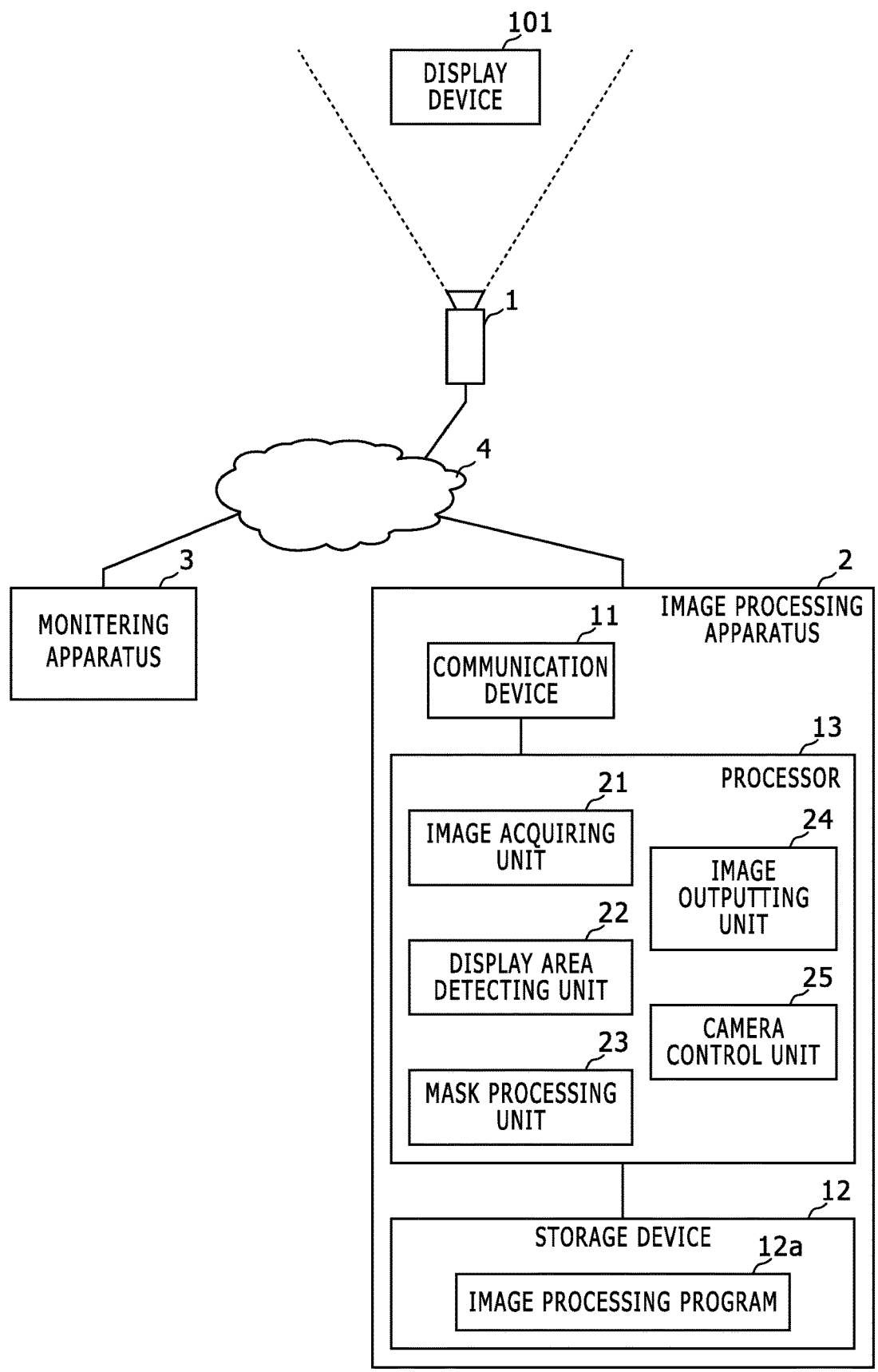
FIG. 1 shows a block diagram that indicates a configuration of a monitoring system according to an embodiment of the present invention.

FIG. 1 shows a block diagram that indicates a configuration of a monitoring system according to an embodiment of the present invention. This monitoring system photographs and monitors a predetermined location within a building. The monitoring system shown in FIG. 1 includes a monitoring camera 1, an image processing apparatus 2, and a monitoring apparatus 3. The monitoring camera 1, the image processing apparatus 2, and the monitoring apparatus 3 are capable of communicating with each other through a network 4 such as a LAN (Local Area Network) and/or Internet.

The monitoring camera 1 photographs a predetermined location and outputs a photographed image in a predetermined data format. Therefore, the monitoring camera 1 is fixed so as to photograph the predetermined location. For example, the monitoring camera 1 is a network camera.

The image processing apparatus 2 acquires the photographed image from the monitoring camera 1 and performs a mask process of a specific part in the photographed image. For example, the image processing apparatus 2 is a relay server for the photographed image, that immediately transfers the photographed image after the mask process to the monitoring apparatus 3 through the network 4.

Specifically, the image processing apparatus 2 (a) detects a frame image of a display device 101 in the acquired photographed image, and (b) performs the mask process of an image of a display screen of the display device 101 on the basis of the detected frame image.

The monitoring apparatus 3 acquires and displays the photographed image after the mask process from the image processing apparatus 2. The photographed image displayed by the monitoring apparatus 3 is watched by an outsider against the aforementioned predetermined location.

As shown in FIG. 1, the image processing apparatus 2 includes a communication device 11, a storage device 12, and a processor 13.

The communication device 11 is a network interface that is connected to the network 4 and performs data communication with another device (i.e. the monitoring camera 1, the monitoring apparatus 3 and the like).

The storage device 12 is a nonvolatile storage device such as flash memory or hard disk and stores a program and data. In the storage device 12, an image processing program 12a is stored.

The processor 13 includes a computer that includes a CPU (Central Processing Unit), a ROM (Read Only Memory), a RAM (Random Access Memory) and the like, and loads a program stored in the storage device 12, the ROM or the like to the RAM and executes the program using the CPU and thereby acts as processing units.

The processor 13 executes the image processing program 12a and thereby acts as an image acquiring unit 21, a display area detecting unit 22, a mask processing unit 23, an image outputting unit 24, and a camera control unit 25.

The image acquiring unit 21 acquires a photographed image from the monitoring camera 1 using the communication device 11.

The display area detecting unit 22 detects in the acquired photographed image a frame image of a display device 101 installed in the aforementioned predetermined location. If plural display devices 101 exist in a sight of the monitoring camera 1, then plural frame images of the plural display devices 101 are detected in the acquired photographed image.

It should be noted that the display area detecting unit 22 may detect a frame image in all frames of the acquired photographed images (i.e. movie) or may detect a frame image in a frame of the acquired photographed images (i.e. movie) with a predetermined interval of plural frames.

The display area detecting unit 22 detects as the frame image an image of a frame that exists in a periphery of four or three sides of a quadrangular shape (substantially rectangular shape, substantially trapezoidal shape or another substantially quadrangular shape) of the display screen. An actual display screen has a substantially rectangular shape, but in the photographed image, it may not have a rectangular shape due to a directional difference between an optical axis of the monitoring camera 1 and the display screen and/or the like, and therefore, also other than a substantially rectangular shape, a frame image is detected in a periphery of four or three sides of a quadrangular shape.

For example, in the photographed image, the frame image is detected as two edges with bending straight-line shapes that are adjacent to each other with a width within a predetermined range. The detection of the edges is performed in accordance with an existent outline detection or a Hough transformation. Otherwise, the detection of the frame image may be performed using a pattern matching technique.

For example, if the display device 101 is a display device that is individually arranged from a desktop PC (Personal Computer) main body, then in the photographed image, a frame exists in a periphery of four sides of its display screen. Therefore, in this case, detected are two edges (an inner edge and an outer edge of the frame) that form substantially quadrangular shapes.

Contrarily, if the display device 101 is a display device of a foldable notebook computer, then in the photographed image, a frame exists in a periphery of three sides (three sides other than its base) of its display screen. Specifically, a main body or a keyboard part of the notebook computer extends from a base of the display screen, and therefore a frame image is not obtained because a frame image must have a small width. Therefore, in this case, two bending straight-line edges (outer and inner edges of the frame) are detected with quadrangular shapes that open at one side.

Figure 2:
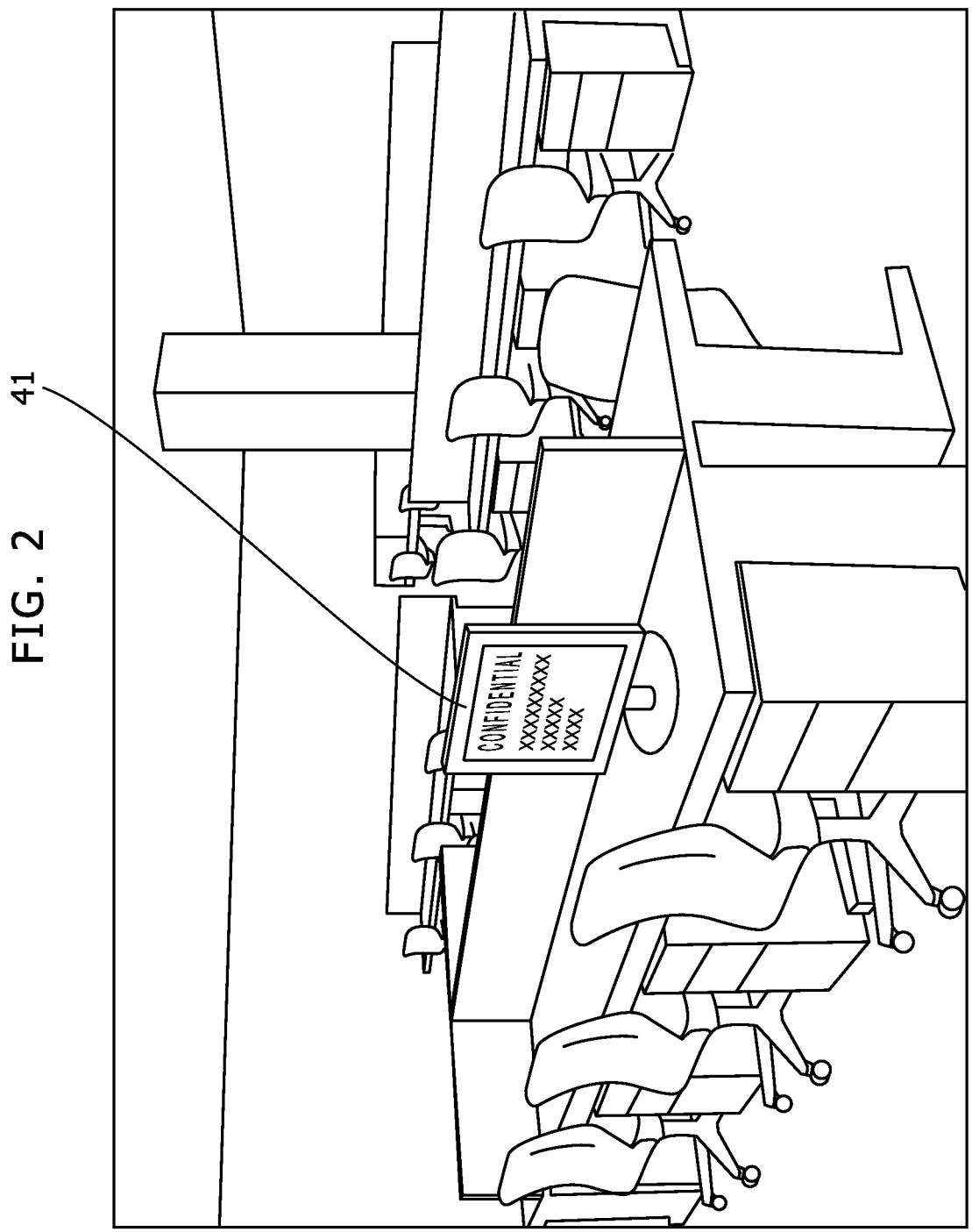
FIG. 2 shows a diagram that indicates an example of a photographed image before a mask process performed in the monitoring system shown in FIG. 1.
Figure 3:
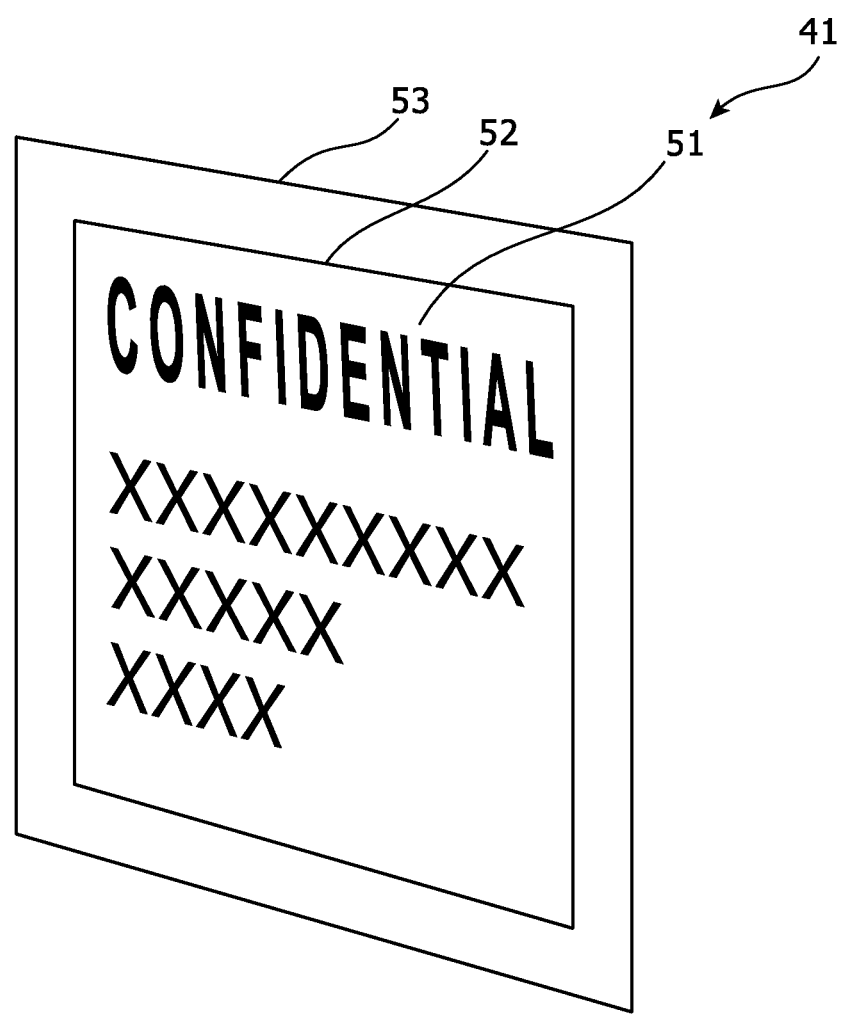
FIG. 3 shows a diagram that explains a behavior of a display area detecting unit 22 in the monitoring system shown in FIG. 1.

FIG. 2 shows a diagram that indicates an example of a photographed image before a mask process performed in the monitoring system shown in FIG. 1. FIG. 3 shows a diagram that explains a behavior of the display area detecting unit 22 in the monitoring system shown in FIG. 1.

For example, as shown in FIG. 2, if an image 41 of the display device 101 exists in the photographed image, then as shown in FIG. 3, detected are two edges 52 and 53 that exist in a periphery of an image 51 of a display screen, and an internal part from the inner edge 52 among the edges 52 and 53 is considered as an image 51 of the display screen.

The mask processing unit 23 performs a mask process of the image of the display screen of the display device 101 in the acquired photographed image on the basis of the detected frame image.

For example, in the mask process, the mask processing unit 23 replaces the image of the display screen with a solid image of a single color (white or black).

Figure 4:
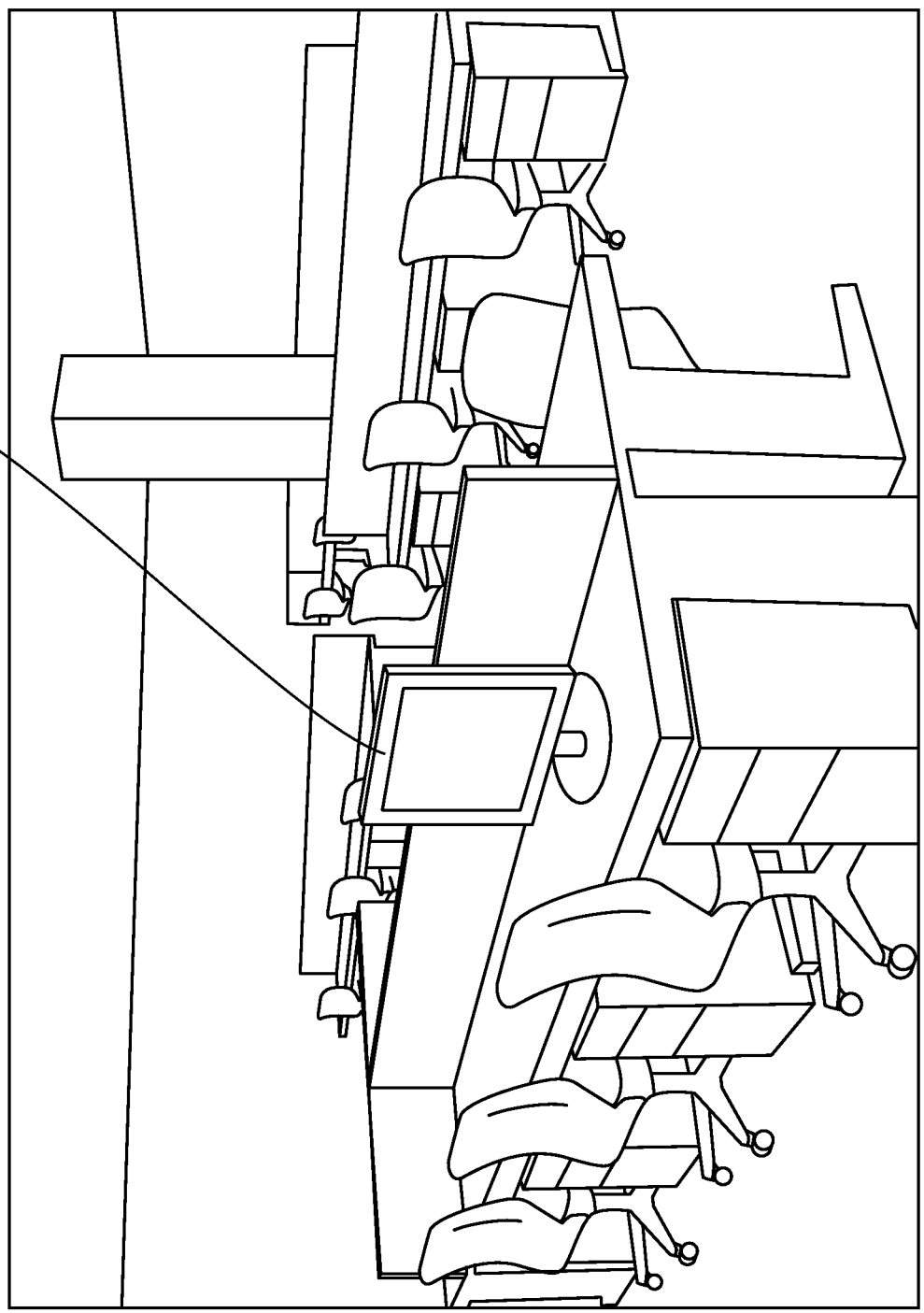
FIG. 4 shows a diagram that indicates an example of a photographed image after a mask process performed in the monitoring system shown in FIG. 1.

FIG. 4 shows a diagram that indicates an example of a photographed image after a mask process performed in the monitoring system shown in FIG. 1. In case of the photographed image as shown in FIG. 2, for example, the display screen is masked as shown in FIG. 4.

The image outputting unit 24 outputs the photographed image after the mask process to the monitoring apparatus 3 using the communication device 11. Further, the image outputting unit 24 may save the photographed image before the mask process in the storage device 12, and using the communication device 11, transmit the saved photographed image to the monitoring apparatus 3 after user authentication, on the basis of an instruction from the monitoring apparatus 3. Furthermore, if this system includes plural monitoring cameras 1 and plural monitoring apparatuses 3, the image outputting unit 24 may set or change association relationships between the monitoring cameras 1 and the monitoring apparatuses 3 after user authentication, on the basis of an instruction from the monitoring apparatus 3. In such a case, the image processing apparatus 2 performs the mask process of the photographed image from the monitoring camera 1, and transmits the photographed image after the mask process to the monitoring apparatus 3 determined correspondingly to this monitoring camera 1 in accordance with the association relationships.

The camera control unit 25 controls a direction, an angle of view and/or the like of the monitoring camera 1 using the communication device 11 in accordance with an instruction from the monitoring apparatus 3. Specifically, the monitoring camera 1 includes a driving unit that changes a direction of its sight (i.e. an optical axis of its photographing optical system), an angle of view and/or the like, and changes the sight using the driving unit in accordance with a control signal from the camera control unit 25

As mentioned, if browsing the saved photographed image, changing a direction, an angle of view or the like, changing a setting data, a user authentication request for these actions, or the like is detected in the image processing apparatus 2, then a notification that informs the detection may be transmitted to a predetermined destination (an administrator), for example, as an email.

The following part explains a behavior of the aforementioned system.

The monitoring camera 1 continuously transmits a photographed image of a predetermined location to the image processing apparatus 2.

In the image processing apparatus 2, the image acquiring unit 21 receives the photographed image using the communication device 11.

Subsequently, if the mask process is performed on the basis of the aforementioned condition, the display area detecting unit 22 tries to detect a frame image of a display device 101 in the photographed image in the aforementioned manner.

If a frame image of a display device 101 is detected by the display area detecting unit 22, then the mask processing unit 23 performs the mask process of an image of a display screen inside of the frame image. The mask processing unit 23 continuously performs the mask process of an image of the display screen until the frame image gets not to be detected by the display area detected unit 22.

Subsequently, the image outputting unit 24 transmits the photographed image after the mask process to the monitoring apparatus 3.

Otherwise, if the mask process is not performed on the basis of the aforementioned condition, the image outputting unit 24 immediately transmits to the monitoring apparatus 3 the photographed image received by the image acquiring unit 21.

In the monitoring apparatus 3, the photographed image is received from the image processing apparatus 2, and displayed on a display device or the like.

As mentioned, in Embodiment 1, the monitoring camera 1 photographs a predetermined location and outputs a photographed image, the image processing apparatus 2 acquires the photographed image from the monitoring camera 1 and performs a mask process of a specific part in the photographed image, and the monitoring apparatus 3 acquires and displays the photographed image after the mask process from the image processing apparatus 2. Further, the image processing apparatus 2 (*a*) detects a frame image of a display device 101 in the acquired photographed image, and (*b*) performs the mask process of an image of a display screen on the display device 101 on the basis of the detected frame image.

Consequently, even if a display device 101 exists in a sight of the monitoring camera 1, an image of a display screen of the display device 101 is masked in the image processing apparatus 2 that relays the photographed image, and therefore, restrained is confidential information leakage from the displayed screen arranged in a sight of the monitoring camera 1.

Embodiment 2

In the monitoring system in Embodiment 2, the monitoring camera 1 includes two cameras for stereo vision, and the image acquiring unit 21 acquires photographed images for the stereo vision from the monitoring camera 1.

Further, in Embodiment 2, the mask processing unit 23 (*a*) determines a distance from the monitoring camera 1 to the display device 101 on the basis of the photographed images for the stereo vision, (b) determines a size of the display device 101 on the basis of the determined distance and the aforementioned frame image (i.e. a size of the frame image), and (c) if the determined size of the display device 101 is out of a predetermined range (i.e. out of a range from a minimum size to a maximum size allowed as a size of the display device 101), determines that it is misdetection and therefore does not perform the mask process of an image of a display screen of this display device 101.

If the determined size of the display device 101 is out of the predetermined range, the mask processing unit 23 performs the mask process of an image of a display screen of this display device 101 as well in Embodiment 1.

Other parts of the configuration and behaviors of the monitoring system in Embodiment 2 are identical or similar to those in Embodiment 1, and therefore not explained here.

Embodiment 3

In the monitoring system in Embodiment 3, when detecting a person image that overlaps an image of the display screen of the display device 101, the mask processing unit 23 performs the mask process of a part that is not laid on the person image in the image of the display screen, and does not perform the mask process of a part that is laid on the person image in the image of the display screen.

For example, the person image is detected using an existent face recognition technique, an existent human recognition technique or the like. Further, a person nearer to the monitoring camera 1 than to the display device 101 may be detected with the aforementioned stereo vision, and the aforementioned process may be performed only for an image of the detected person.

Consequently, an image of a person in the photographed image is not removed.

Other parts of the configuration and behaviors of the monitoring system in Embodiment 3 are identical or similar to those in Embodiment 1 or 2, and therefore not explained here.

Embodiment 4

In the monitoring system in Embodiment 4, the mask processing unit 23 determines whether the image of the aforementioned display screen is a solid image (i.e. an image with a single density such as white or black) or not, and if the image of the display screen is a solid image with a single density, then determines that the display device 101 is in a powered-off status, and therefore does not perform the mask process. If the image of the display screen is not a solid image, then it is determined that the display device 101 is in a powered-on status, and therefore, if a frame image as mentioned is detected, then the mask process is performed.

Other parts of the configuration and behaviors of the monitoring system in Embodiment 4 are identical or similar to those in any of Embodiments 1 to 3, and therefore not explained here.

Embodiment 5

In the monitoring system in Embodiment 5, the display area detecting unit 22 excludes an image of a moving object in the photographed image from the detection of the frame image of the display device. For example, the detection of the frame image of the display device is not performed on an object of which a position changes in the photographed image between frames of the photographed image.

Other parts of the configuration and behaviors of the monitoring system in Embodiment 5 are identical or similar to those in any of Embodiments 1 to 4, and therefore not explained here.

Embodiment 6

In the monitoring system in Embodiment 6, if a current time is in a predetermined time zone (a time zone that there are no person, such as midnight or early morning), the mask processing unit 23 does not perform the mask process; and if a current time is not in the predetermined time zone, the mask processing unit 23 performs the mask process.

Other parts of the configuration and behaviors of the monitoring system in Embodiment 6 are identical or similar to those in any of Embodiments 1 to 5, and therefore not explained here.

Embodiment 7

In the monitoring system in Embodiment 7, the aforementioned "predetermined location" is a space (a room, a floor or the like) for which entry-and-exit control is performed by an entry-and-exit control system; and from the entry-and-exit control system, the mask processing unit 23 acquires information that indicates the number of persons in an entry status, and if at least one person has entered the predetermined location, then performs the mask process when detecting the frame image; and if no persons have entered the predetermined location, the mask processing unit 23 does not perform the mask process.

Other parts of the configuration and behaviors of the monitoring system in Embodiment 7 are identical or similar to those in any of Embodiments 1 to 6, and therefore not explained here.

Further, it should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to a monitoring system.

The invention claimed is:

1. A monitoring system, comprising:
   a monitoring camera that photographs a predetermined location and outputs a photographed image;
   an image processing apparatus that acquires the photographed image from the monitoring camera and performs a mask process of a specific part in the photographed image; and
   a monitoring apparatus that acquires and displays the photographed image after the mask process from the image processing apparatus;
   wherein the image processing apparatus (a) detects a frame image of a display device in the acquired photographed image, and (b) performs the mask process of an image of a display screen on the display device on the basis of the detected frame image; wherein the image processing apparatus determines whether the image of the display screen is a solid image or not, and if the image of the display screen is a solid image with a single density, does not perform the mask process.

2. An image processing apparatus, comprising:
   an image acquiring unit that acquires a photographed image from a monitoring camera that photographs a predetermined location and outputs the photographed image;
   a display area detecting unit that detects in the acquired photographed image a frame image of a display device installed in the predetermined location;
   a mask processing unit that performs a mask process of an image of a display screen on the display device in the acquired photographed image, on the basis of the detected frame image; and
   an image outputting unit that outputs to a monitoring apparatus the photographed image after the mask process; wherein the mask processing unit determines whether the image of the display screen is a solid image or not, and if the image of the display screen is a solid image with a single density, does not perform the mask process.

3. The image processing apparatus according to claim 2, wherein the display area detecting unit detect the frame image as an image of a frame that exists in a periphery of four or three sides of a quadrangular shape of the display screen.

4. The image processing apparatus according to claim 2, wherein the monitoring camera comprises two cameras for stereo vision;
   the image acquiring unit acquires photographed images for the stereo vision; and
   the mask processing unit (a) determines a distance from the monitoring camera to the display device on the basis of the photographed images for the stereo vision, (b) determines a size of the display device on the basis of the determined distance and the frame image, and (c) if the determined size of the display device is out of a predetermined range, does not perform the mask process of an image of a display screen of this display device.

5. The image processing apparatus according to claim 2, wherein when detecting an image of a person that overlaps an image of the display screen of the display device, the mask processing unit performs the mask process of a part of the display screen that is not overlapped by the image of the person, and does not perform the mask process of a part that is overlapped by the image of the person.

6. The image processing apparatus according to claim 2, wherein the display area detecting unit excludes an image of a moving object in the photographed image from the detection of the frame image of the display device.

7. The image processing apparatus according to claim 2, wherein if a current time is in a predetermined time zone, the mask processing unit does not perform the mask process; and if a current time is not in the predetermined time zone, the mask processing unit performs the mask process.

8. The image processing apparatus according to claim 2, wherein the predetermined location is a space for which entry-and-exit control is performed; and if at least one person has entered the predetermined location, the mask processing unit performs the mask process, and if no persons have entered the predetermined location, the mask processing unit does not perform the mask process.

* * * * *